Jan. 9, 1968   W. K. JOHNSON ET AL   3,362,222
FLUID SAMPLING APPARATUS AND FLOWMETER
Filed July 14, 1965   2 Sheets-Sheet 1
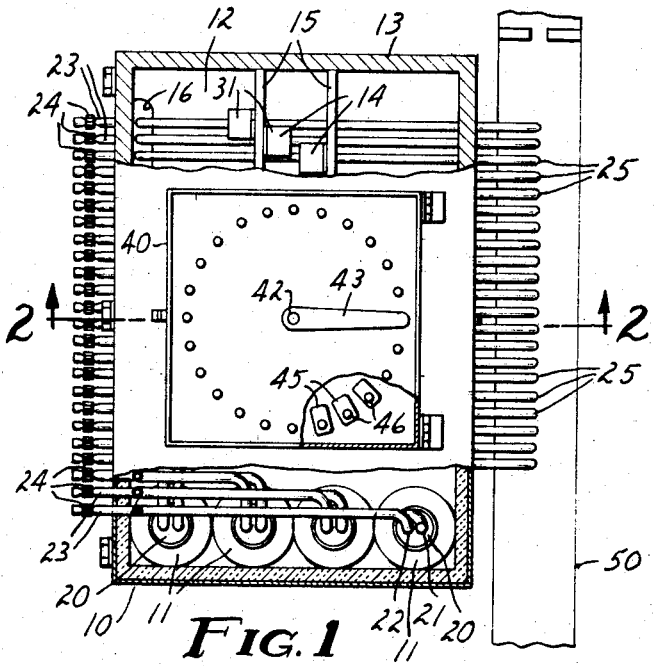
FIG.1
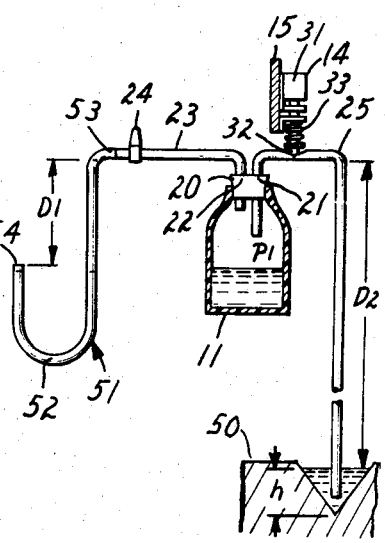
FIG.3
FIG.2
INVENTORS
WALTER K. JOHNSON
NORMAN R. ZIEMKE
BY Merchant, Merchant & Gould
ATTORNEYS

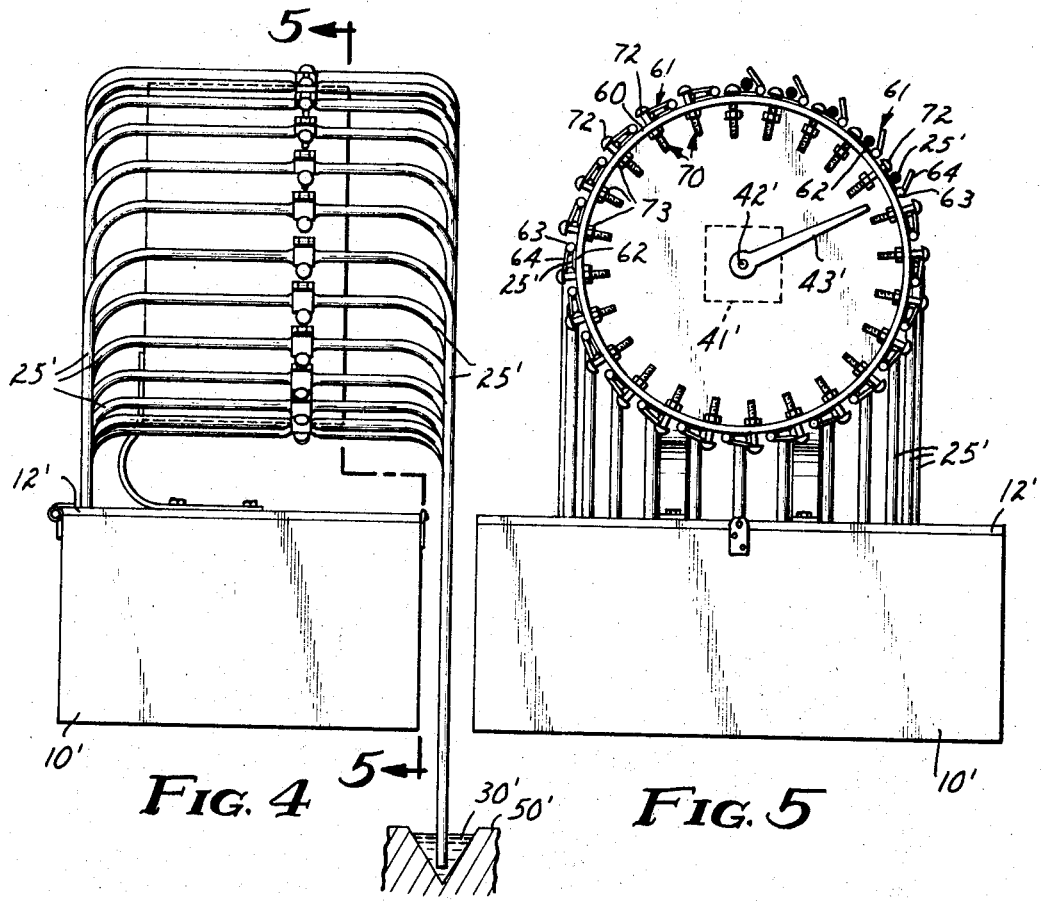
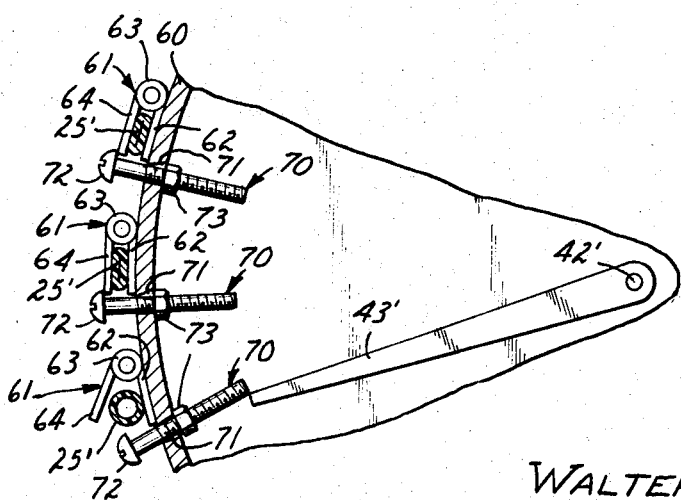

United States Patent Office 3,362,222
Patented Jan. 9, 1968

3,362,222
FLUID SAMPLING APPARATUS AND FLOWMETER
Walter K. Johnson, 5321 29th Ave. S. 55417, and Norman R. Ziemke, 9068 NE. Van Buren 55433, both of Minneapolis, Minn.
Filed July 14, 1965, Ser. No. 471,994
8 Claims. (Cl. 73—198)

ABSTRACT OF THE DISCLOSURE

Apparatus including a plurality of fluid tight bottles substantially evacuated prior to use thereof, and each having in communication therewith an elongated tube adapted to communicate with a fluid stream from which samples are to be taken. Each of the tubes has means associated therewith for closing the tube to maintain a vacuum in the bottle until a prescribed period of time. The free end of the tubes is placed in communication with a fluid stream, and a timer is used to sequentially and at predetermined intervals open the closing means so that a portion of the stream is drawn into each of the bottles. Means for determining the rate of flow of the stream at the times when each of the samples are obtained is also included, one of which is to close the tubes after the samples are taken and measure the vacuum remaining in the bottle to determine the height of the stream at the time the sample was taken.

---

The present invention pertains to apparatus for obtaining samples of a fluid in a stream to provide a composite sample spanning a predetermined period of time and variations of the rate of flow of the stream during that period of time and more particularly to apparatus for obtaining periodic samples of such a fluid and including means for determining the rate of flow of the stream at the times when the samples are obtained.

In the construction and operation of processing plants such as sewage disposal plants or the like it is generally necessary to test the incoming as well as the outgoing flow of fluid to determine the required capacity of the plant as well as to periodically determine whether the plant has sufficient capacity and is operating efficiently. In general these tests are made on a composite sample which is acquired by a man stationed at the site for a predetermined period of time, usually twenty-four hours. The man stationed at the site dips into the stream every hour and obtains a sample. In some cases a permanent installation is utilized to acquire the samples. Quantities, determined by the rate of flow of the stream at the time of obtaining the sample, of each of the samples may then be mixed to form a single composite sample. The tests are then performed on this composite sample or on the individual samples.

In the present invention apparatus is utilized to automatically obtain samples from the stream at the desired time intervals and, in the event that the rate of flow of the stream is not obtainable from the plant, means are provided for determining the rate of flow of the stream at the time a particular sample is obtained. In the present device a plurality of pre-evacuated containers having in communication therewith long passageways, which in this case are pliable tubes or hoses, and electrical solenoid operated valves normally sealing the tubes to maintain the vacuum in the containers. The containers are iced in an insulated box primarily to inhibit bacterial action and the box also helps prevent freezing, overheating, etc. The box with the containers therein is positioned at the site where it is desired to obtain samples and the free end of each of the tubes is placed in the stream. The solenoids are sequentially operated by an electrical timing device to open the passageways and allow fluid to flow from the stream into the containers thereby partially filling the vacuum therein. Thus, the desired samples of the fluid can be obtained automatically at predetermined intervals of time for any length of time desired.

In some instances when testing streams at already established plants the rate of flow of the stream can be obtained from apparatus in the plant. However, in many instances the rate of flow of the stream cannot be obtained and the present invention has incorporated therein apparatus and a method for obtaining the rate of flow of the stream at the precise time when the samples are obtained. To obtain the rate of flow of the stream a device is utilized in which the rate of flow is dependent upon the liquid level therein. An example of such a device is a weir and in particular a triangular-notch weir. In a 90° triangular-notch weir the rate of flow is given approximately by the formula $$Q = 2.44\, h^{5/2}$$

where:

Q is in cubic feet per second, and
h is the head on the weir in feet.

When a triangular-notch weir of this type is placed in the stream and the tubes from the containers are placed in the stream in juxtaposition thereto, which should be some known distance upstream therefrom, the height of the fluid in the weir and, thus, the rate of flow of fluid in the weir can be calculated directly in the manner to be described by measuring the amount of vacuum remaining in each of the containers and incorporating some known values such as the height above the bottom of the weir of the point at which the solenoid seals the tube communicating with the container.

It is an object of the present invention to provide apparatus for automatically obtaining samples of an impure fluid in a stream at predetermined intervals of time.

It is a further object of the present invention to provide apparatus for determining the rate of flow of the fluid in the stream at the times when the samples are obtained.

It is a further object of the present invention to provide a method of determining the rate of flow of the fluid in the stream from indications provided by the disclosed apparatus.

These and other objects of this invention will become apparent to those skilled in the art upon consideration of the accompanying specification, claims, and drawings.

Referring to the drawings, wherein like characters indicate like parts throughout the figures:

FIG. 1 is a view in top plan of the present apparatus, parts thereof broken away and shown in section;

FIG. 2 is a sectional view as seen from the line 2—2 in FIG. 1;

FIG. 3 is a somewhat schematic view of the present invention illustrating apparatus for determining the rate of flow of fluid in a stream;

FIG. 4 is a view in side elevation of another embodiment illustrating apparatus for sequentially opening passageways;

FIG. 5 is a sectional view as seen from the line 5—5 in FIG. 4; and

FIG. 6 is an enlarged detailed view illustrating the operation of a single passageway securing unit.

Referring to the figures the numeral 10 indicates an insulated box containing a plurality of containers or bottles 11. The number of bottles 11 in the box 10 is dependent upon the number of samples desired and in the present embodiment there are twenty-four. The bottles 11 are packed in the insulated box 10 to prevent freezing, and kept iced to prevent rapid deterioration or oxidation under high heat conditions, etc. The box 10 has a hinged lid 12 which opens upwardly for ready access to the bottles 11. Mounted on the lid 12 is a second box 13 which contains a plurality of solenoids 14. The main body of each of the solenoids 14 is rigidly mounted on either of two vertical walls 15 which are rigidly attached to the sides and top of the box 13 or may be an integral part thereof. The lid 12 of the box 10 has an opening along the hinged side thereof and the box 13 has a mating opening in the bottom thereof, which openings are both numbered 16 and will be explained presently.

Each of the bottles 11 has a stopper 20 therein which provides an airtight seal for the bottle 11 except for two holes 21 and 22 in the stopper 20. The hole 21 has a passageway in communication therewith, which in the present embodiment is a semi-flexible tube 23. Tube 23 passes from the hole 21 in stopper 20 out through a hole in the back of the insulated box 10 and is sealed by means of an airtight clamp 24 on the end thereof. The use of the tube 23 will be explained in more detail later. The hole 22 in the stopper 20 has a passageway in communication therewith, which in this embodiment is a semi-flexible tube 25, that passes from the hole 22 in the stopper 20 through the openings 16 in the lid 12 and the bottom of the box 13, along the bottom of the box 13 and out an opening 26 in the front of the box 13. The tube 25 is sufficiently long to extend from the hole 26 in the front of the box 13 down into the fluid, which is indicated by the numeral 30, a substantial distance to allow for variations in the height thereof.

Each of the tubes 25 in communication with a bottle 11 has a solenoid 14 associated therewith. The solenoid 14 has a coil 31, a plunger 32 and a spring 33 which biases the plunger 32 to normally bear against the tube 25 providing an airtight seal therein. When the coil 31 of the solenoid 14 is energized the plunger 32 is pulled away from the tube 25 providing an unobstructed passage through the tube from the fluid 30 to the bottle 11.

Hingedly attached to the top of the box 13 is a box 40. A motor 41 fixedly attached to the top of the box 40 and approximately centrally located thereon is geared to a centrally located shaft 42 so that the shaft 42 rotates once every twenty-four hours. The motor 41 is mounted to the underside of the top of the box 40 and the shaft 42 protrudes therethrough. An arm 43 is attached to the protruding end of the shaft 42 for rotation therewith in a plane parallel to the top of the box 40. The underside of the extended end of the arm 43 has a cam-like downwardly extended portion 44. A plurality of make-and-break, push-button type switches 45 are fixedly attached to the underside of the top of the box 40 so that the buttons 46 thereon protrude through the upper surface. The switches 45 are evenly spaced so that the buttons 46 appear in a circumference equal to the path of travel of the protruding end 44 of the arm 43. Thus, as the motor 41 rotates the arm 43 the end 44 sequentially depresses buttons 46 on switches 45. In the present embodiment the motor 41 and switches 45 are adjusted so that a button 46 of one of the switches 45 is depressed every hour for twenty-four hours. It should be understood, however, that a greater or lesser number of switches could be utilized if more or less samples are desired.

Each of the switches 45 is electrically connected to a solenoid coil 31 by means of wires passing through a hole 47 in the top of the box 13. A suitable energization source, not shown, is also connected to the solenoid coils 31 through the switches 45 so that when a button 46 of a switch 45 is depressed the associated solenoid coil 31 is energized, the plunger 32 is raised and the tube 25 is unsealed whereby the vacuum in the bottle 11 draws fluid 30 from the stream. In instances where the fluid 30 may contain particles of solid material the tubes 25 must be opened to their full diameter immediately, rather than gradually, since some of the particles might be prevented from entering the sample or might build up and seal the tube 25 before the required amount of the fluid 30 is allowed to enter the bottle 11. Since the solenoids 14 operate the plunger 32 almost instantaneously the tube 25 is opened to its full diameter substantially immediately. After the arm 43 has rotated past a particular switch 45 the button 46 returns to its normal position, the switch 45 opens, the solenoid 14 is de-energized and the tube 25 is resealed.

Once the sample of fluid is drawn into the bottle 11 and the tube 25 is sealed the rate of flow of the fluid 30 in the stream can be obtained by measuring the vacuum remaining in the bottle 11 and making certain calculations with known dimensions which will be described presently in conjunction with FIG. 3. In the figures a triangular-notch weir 50 is mounted in the stream with the fluid 30 flowing therethrough. In FIG. 3 the height of the fluid in the triangular-notch weir 50 is indicated $h$. The height above the fluid 30 of the point at which the solenoid 14 seals the tube 25 is indicated $D_2$. The pressure, or the amount of vacuum remaining in the bottle 11 after the tube 25 has been temporarily sealed to allow fluid to flow therein, is indicated $P_1$. A manometer 51 having a fluid 52 therein is attached at an end 53 to the free end of the tube 23, which is in communication with the bottle 11 and the other end 54 is open. The clamp 24 initially remains in place.

As is well known in the art the difference in levels of the fluid 52 in the manometer 51 between the arm having the end 53 connected to the tube 23 and the arm having the end 54 with atmospheric pressure thereon is indicative of the difference between the pressure $P_1$ in the bottle 11 and atmospheric pressure. Since the pressure $P_1$ in the bottle 11 will be a slight vacuum the level of the fluid 52 in the arm connected to the tube 23 will be higher than the fluid in the arm having the end 54 open to atmospheric pressure. This difference of levels is indicated by $D_1$ in FIG. 3.

To measure the pressure, $P_1$, in the bottle 11 the end 54 of the manometer 51 is raised until the fluid 52 is nearly flowing out of the end 53. In this position the end 53 is attached to the open end of the tube 23 and the end 54 of the manometer 51 is lowered until the difference $D_1$ in levels of the fluid 52 is approximately the difference for the anticipated amount of vacuum $P_1$ in the bottle 11, or preferably slightly greater. At this time the clamp 24 is removed from the tube 23 and the levels of the fluid 52 in the two arms of the manometer 51 move until the difference $D_1$ is indicative of the pressure $P_1$ in the bottle 11. If the manometer 51 was properly adjusted before removing the clamp 24 the fluid will flow away from the end 53, therefore, producing no adverse effect on the pressure $P_1$ in the bottle 11. If the manometer 51 was not correctly adjusted and the fluid 52 flows toward the end 53 some air or fluid from the manometer 51 will be introduced into the bottle 11 and the pressure $P_1$ will be slightly in error.

Once the difference in levels $D_1$ of the manometer 51 is accurately measured, the pressure $P_1$ in the bottle 11 can be calculated from the formula $$P_1 = -K_1 D_1 \rho_1$$

where $D_1$—the level differential in inches,
$\rho_1$=density of manometer fluid, and
$K_1$=conversion factor for units.

The distance $D_2$ can then be calculated from the formula $$D_2 = \frac{-P_1}{K_2 \rho_2}$$

where $K_2$=conversion for units,
$\rho_2$=density of fluid 30, and
$D_2$=distance in inches.

These formulas can be combined to make a final formula in which $D_2$ is calculated directly.

$$D_2 = \frac{K_1 \rho_1}{K_2 \rho_2} D_1$$

By measuring the height above the bottom of the weir 50 at which the solenoid 14 seals the tube 25 the head $h$ can be calculated by subtracting the calculated value of $D_2$ therefrom. Once the head $h$ of the fluid 30 in the weir 50 is calculated the rate of flow of the fluid 30 through the weir 50 can be calculated from the formula such as that for a 90° weir:

$$Q = 2.44 \, h^{5/2}$$

By making these calculations for each of the twenty-four bottles 11 in the container 10 the rate of flow of the fluid 30 at the precise time that each of the samples entered the bottles 11 is obtained.

FIGS. 4–6 illustrate another embodiment of apparatus for maintaining a plurality of resilient tubes 25' normally closed and sequentially opening the tubes 25' at desired times. Apparatus in FIGS. 4–6 which is similar to apparatus in FIGS. 1 and 2 is indicated with a similar number and a prime added. All of the apparatus for the second embodiment is mounted on a hollow cylinder or drum 60 which is in turn mounted on the lid 12' of an insulated box 10'. Each of the tubes 25' is brought out of the box 10' through an opening 16' in the lid 12' and extends the length of the drum 60 along the outer surface thereof. The tubes 25' are equally spaced about the outer periphery of the drum 60 and are fixedly secured to the outer surface thereof by some means such as metal straps, tape, glue, etc. The tubes 25' extend from the front of the drum 60 downwardly into the fluid 30', as in the previous embodiment.

Associated with each of the tubes 25' on the drum 60 is a small closing device, which may simply be a hinge such as a butt hinge 61 or the like. The hinges 61 are mounted about the outer periphery of the drum 60 and are equally spaced apart about a centrally located circumference of the drum 60. Each of the hinges 61 is mounted with a leaf 62 secured to the outer surface of the drum by some means such as soldering or the like so that the pintles 63 are parallel to each other and to the longitudinal axis of the drum. The tubes 25' are placed adjacent the pintles 63 on the leaf 62 so that a second leaf 64 of the hinge 61 squeezes the tube 25' closed when the hinge 61 is closed.

A small bolt 70, or other similarly shaped device, is utilized to maintain the hinge 61 closed until the desired period of time at which it is to be opened. The bolt 70 is mounted in a relatively loose fitting hole 71 in the side of the drum 60 so that the head 72 of the bolt 70 is on the outside of the drum and a nut 73 threaded onto the bolt 70 is adjacent the inner surface of the drum 60. The hole 71 in the drum 60 has a diameter slightly smaller than the nut 73 but large enough to allow transverse movement of the bolt 70 therein. To secure the hinge 61 closed over the associated tube 25' the edge of the head 72 of the bolt 70 is engaged with the outer surface of the leaf 64 and the nut 73 is threaded onto the bolt 70 until it engages the inner surface of the drum 60. The hinge 61 is thus maintained in the closed position and the tube 25' is pinched between the leaves 62 and 64 to maintain it sealed. The bolt 70 has a substantial length thereof extending radially inwardly toward the center of the drum 60.

Mounted at the center of the drum 60 is a motor 41' (electrically or spring operated) which is geared to a shaft 42' coaxial with the drum 60. The shaft 42' is geared to rotate one complete revolution every twenty-four hours. An arm 43' is attached to the end of the shaft 42' for rotation therewith in a plane containing the bolts 70. The arm 43' extends radially outwardly from the shaft 42' a sufficient distance to engage the inwardly extending ends of the bolts 70 as it passes each of the bolts 70 and rotates the bolts slightly about an axis perpendicular to the bolts and parallel to the axis of the drum 60.

The slight rotation of the bolt 70 causes the edge of the head 72 to be disengaged from the leaf 64 of the hinge 61. Once the edge of the head 72 is disengaged from the leaf 64 the tube 25' expands to its full diameter, since the tube 25' is resilient, and fluid 30' is free to flow into the bottles 11'. It should be noted that upon engagement of the arm 43' with a bolt 70 the associated tube 25' opens immediately to its full diameter whereby any solid particles in the fluid 30' are free to pass therethrough as well as fluids. Also, in this particular method of sequentially opening tubes 25', the tubes 25' remain open after the arm 43' has passed and therefore the rate of flow of the fluid 30' in the stream cannot be obtained at a later time. Thus, this embodiment could be utilized only where the rate of flow of the stream is measured with additional equipment.

To provide a composite sample for the testing of the fluid 30 or 30' a predetermined amount of the sample in each bottle 11, depending upon the rate of flow of the fluid 30 or 30' at the time the sample was obtained, is mixed into a single container. For example, the operator may decide to take one hundred milliliters from each sample for each one hundred gallons per minute of fluid flow. Thus, if the fluid 30 was flowing at the rate of one hundred gallons per minute when the first sample was taken one hundred milliliters of that sample will be used in the composite sample, if the fluid 30 was flowing at the rate of two hundred gallons per minute when the second sample was taken two hundred milliliters of that sample will be utilized in the composite sample, if the fluid 30 was flowing at the rate of fifty gallons per minute when the third sample was taken fifty milliliters of that sample will be utilized in the composite sample, etc.

Thus, apparatus is disclosed which automatically obtains samples of a fluid, such as sewage or the like, at predetermined intervals of time and in at least one embodiment simultaneously provides indications of the rate of flow of the fluid at the time the sample is taken. Utilizing portions of the samples commensurate with the rate of flow of the stream a composite sample can be provided for testing purposes.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:

1. Apparatus for obtaining samples of a fluid in a stream spanning a predetermined period of time and variations of the rate of flow therein comprising:
   (a) a plurality of airtight substantially evacuated containers;
   (b) a passageway in communication with each of said containers of sufficient length to communicate with said stream at the other end thereof;
   (c) closing means associated with each of said passageways for closing thereof whereby said container and communicating passageway is rendered airtight;
   (d) a timer having sequential periodic actuating means; and
   (e) means connecting said closing means to said actuating means for opening said passageways in a predetermined sequence and at predetermined intervals to allow fluid to flow therethrough from said stream into said containers.

2. Apparatus for obtaining samples of a fluid in a stream spanning a predetermined period of time and variations of the rate of flow therein comprising:
   (a) a plurality of airtight substantially evacuated containers;

(b) a passageway in communication with each of said containers of sufficient length to communicate with said stream at the other end thereof;

(c) closing means associated with each of said passageways for closing thereof whereby said container and communicating passageway is rendered airtight;

(d) a timer having sequential periodic actuating means; and (e) means connecting said closing means to said actuating means for temporarily opening said passageways in a predetermined sequence and at predetermined intervals to allow fluid to flow therethrough from said stream into said containers.

3. The apparatus substantially as set forth in claim 2 having in addition thereto means for determining the rate of flow of said stream at the times when said passageways are open.

4. The apparatus set forth in claim 3 wherein the means for determining the rate of flow of the stream comprises a second sealable passageway in communication with each container and apparatus for measuring the amount of vacuum remaining in said containers attached thereto.

5. The apparatus set forth in claim 3 wherein the means for determining the rate of flow of the stream comprises a weir in the stream, a second passageway in communication with each container adapted to have a manometer operatively attached to the free end thereof, and means normally maintaining said passageway closed.

6. Apparatus for obtaining samples of a fluid in a stream spanning a predetermined period of time and variations of the rate of flow therein comprising:

(a) a plurality of airtight containers adapted to be substantially evacuated;

(b) a passageway in communication with each of said containers of sufficient length to communicate with said stream at the other end thereof;

(c) an electrical solenoid associated with each of said passageways having the plunger thereof positioned to seal said associated passageway when the solenoid is de-energized and unseal said associated passageway when the solenoid is energized;

(d) a timer including a periodically rotating arm and a plurality of switches spaced along the path of said rotating arm for temporary operation upon contact therewith;

(e) electrical means adapted to have an energization source connected thereto operatively connecting said solenoids to said switches for energizing said solenoids in a predetermined sequence thereby temporarily unsealing said passageways in the predetermined sequence to allow fluid to flow therethrough from said stream into said containers; and (f) means for determining the rate of flow of said stream at the times when said passageways are unsealed.

7. A method of obtaining the rate of flow of a fluid in a stream comprising the steps of:

(a) evacuating an airtight container having a passageway in communication therewith which may be sealed and unsealed at will;

(b) placing the other end of said passageway in communication with said stream;

(c) temporaily unsealing said passageway to allow said evacuated container to draw fluid from said stream partially filling said vacuum in said container;

(d) measuring the vacuum remaining in said container; and (e) calculating the height of the fluid in said stream from the measured remaining vacuum and the rate of flow of fluid in said stream from the height of fluid therein.

8. A method of obtaining the rate of flow of a fluid in a stream comprising the steps of:

(a) evacuating an airtight container having a passageway in communication therewith which may be sealed and unsealed at will;

(b) placing a weir in said stream;

(c) placing the other end of said passageway in communication with said stream in juxtaposition to said weir;

(d) temporarily unsealing said passageway to allow said evacuated container to draw fluid from said stream partially filling said vacuum in said container;

(e) measuring the vacuum remaining in said container; and (f) calculating the height of the fluid in said weir from the measured remaining vacuum and the rate of flow of fluid through said weir from the height of fluid therein.

References Cited

UNITED STATES PATENTS

| | | | |
|---|---|---|---|
| 1,010,032 | 11/1911 | Flood | 73—423 |
| 2,374,227 | 4/1945 | Metcalf | 73—421.5 |
| 2,479,787 | 8/1949 | Stevens | 73—421.5 X |
| 2,736,201 | 2/1956 | Ohlsen et al. | 73—198 X |
| 3,153,345 | 10/1964 | Berg | 73—423 |
| 3,194,069 | 7/1965 | Scott | 73—219 |
| 3,245,269 | 4/1966 | Ivie | 73—23.1 X |

RICHARD C. QUEISSER, *Primary Examiner.*

JAMES J. GILL, *Examiner.*

E. D. GILHOOLY, *Assistant Examiner.*